REPETITION-PERIOD LIMITER

Filed Feb. 25, 1955 2 Sheets-Sheet 1

April 1, 1958 D. S. KUSHNER 2,829,250

REPETITION-PERIOD LIMITER

Filed Feb. 25, 1955 2 Sheets-Sheet 2

2,829,250

REPETITION-PERIOD LIMITER

David S. Kushner, Brooklyn, N. Y., assignor to Hazeltine Research, Inc., Chicago, Ill., a corporation of Illinois Application February 25, 1955, Serial No. 490,495

5 Claims. (Cl. 250—27)

*General*

Figure 1:
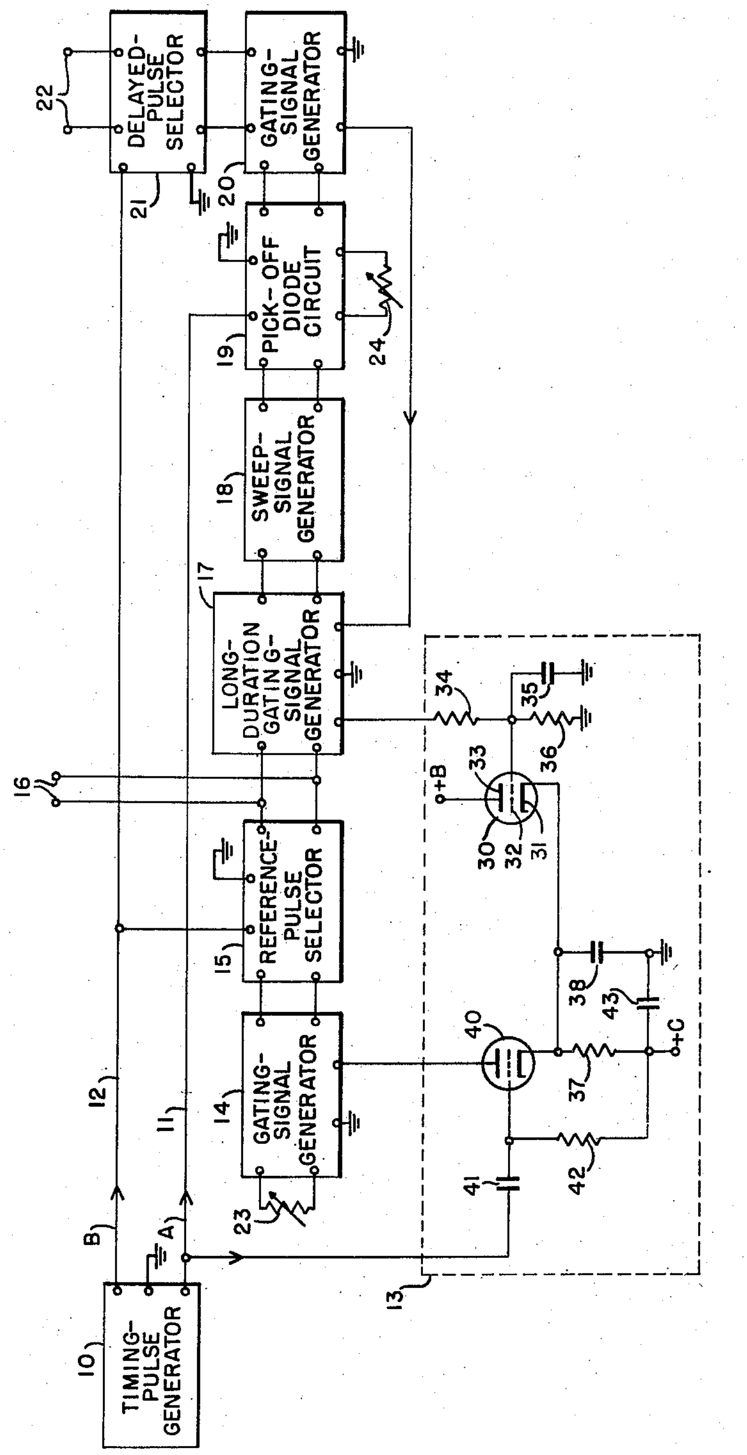

This invention relates to repetition-period limiters and, particularly, to such limiters which are useful in a system for generating periodic pairs of reference pulses and delayed pulses. For convenience such a system shall be referred to hereinafter as a "delayed-pulse generating system."

A delayed-pulse generating system in which the present invention may be utilized is disclosed and claimed in the copending application Serial No. 387,853, of R. G. Nelson, entitled "Delayed-Pulse Generating System," and filed October 23, 1953, Patent No. 2,790,075, issued April 23, 1957. The system there described is capable of generating periodic pulse pairs where the initial pulse of each pair is referred to as a reference pulse while the later pulse of each pair is referred to as a delayed pulse. The system provides for independent adjustment of both the repetition period of the pulse pairs and the delay interval between the reference pulse and delayed pulse of each pair. In order that confusion may not arise, it is desirable that the repetition period not be allowed to become shorter than the delay interval between reference pulse and delayed pulse otherwise a second reference would be produced before the delayed pulse associated with the first reference pulse had been developed. It is also found, in such a system, that the timing circuits thereof require a certain recovery interval following the generation of each pulse pair before they are in a condition to generate the next pulse pair. It is further found that the duration of the required recovery interval increases as the delay interval between reference pulse and delayed pulse is increased.

It is an object of the invention, therefore, to provide a new and novel repetition-period limiter for a delayed-pulse generating system where the repetition period and delay interval thereof are independently variable.

It is another object of the invention to provide a new and improved repetition-period limiter for a delayed-pulse generating system where the limiting action of the limiter is automatically extended beyond the delay interval by an amount dependent on the duration of the delay interval.

In accordance with the invention, in a system including circuit means for periodically developing a reference pulse and initiating a timing cycle which results in subsequent development of a delayed pulse, where the repetition period and the delay interval between reference pulse and delayed pulse are independently variable, a repetition-period limiter comprises circuit means for supplying a gating signal of duration representative of the duration of the delay interval. The repetition-period limiter also comprises circuit means responsive to the gating signal for preventing further operation of the circuit means for periodically developing a reference pulse until a sufficient time after the delay interval to allow satisfactory recovery of other system components.

For a better understanding of the present invention, together with other and further objects thereof, reference is had to the following description taken in connection with the accompanying drawings, and its scope will be pointed out in the appended claims.

Figure 2:
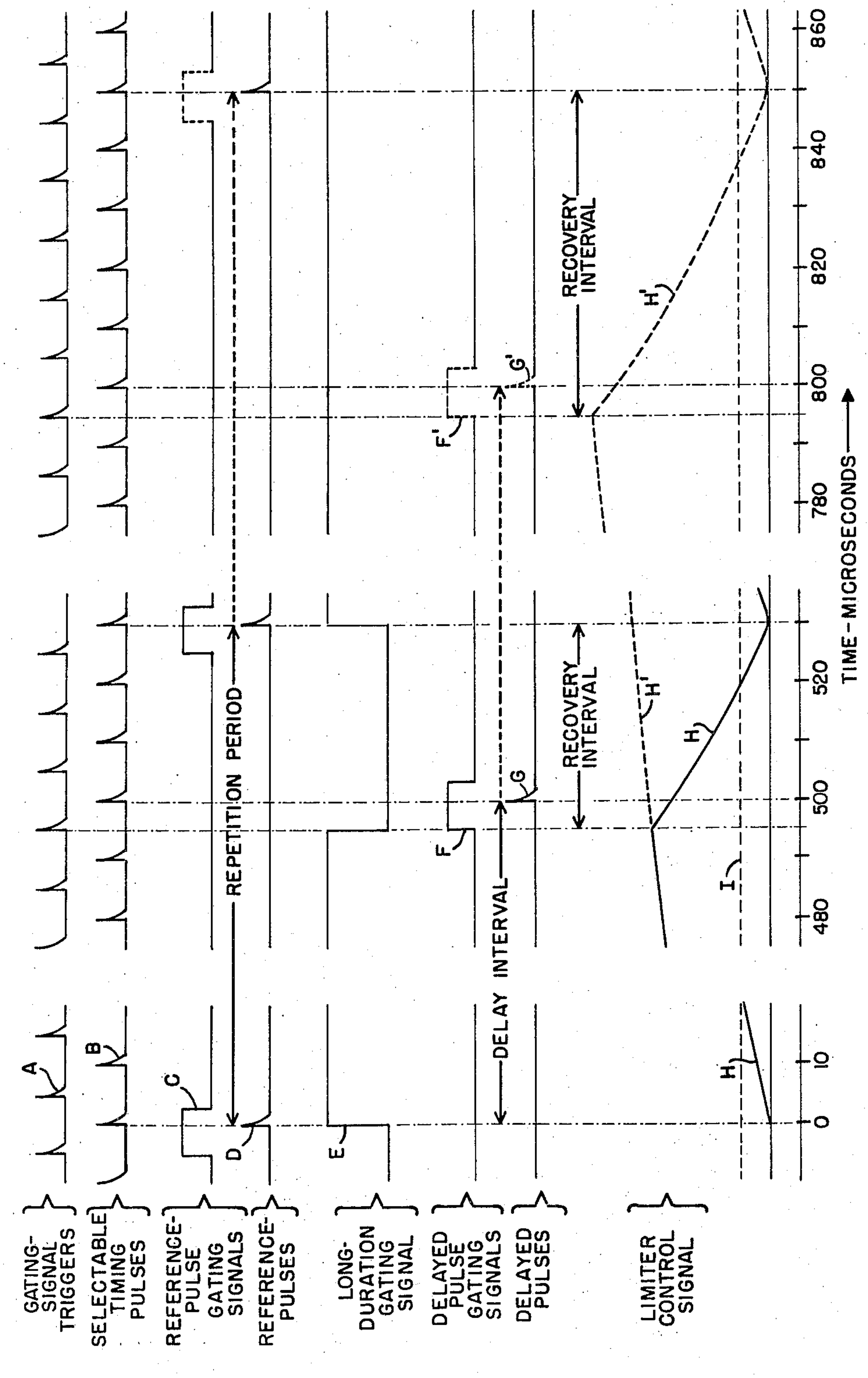

Referring to the drawings:

Fig. 1 is a circuit diagram, partly schematic, of a delayed-pulse generating system including a repetition-period limiter constructed in accordance with the present invention, and Fig. 2 is a graph representing signals developed at various points of the Fig. 1 system and used in explaining the operation thereof.

*Description and operation of delayed-pulse generating system*

Referring to Fig. 1 of the drawings, the delayed-pulse generating system there represented comprises a timing-pulse generator 10 for producing two sets of accurately spaced timing pulses, the pulses of each set being spaced at intervals of, for example, 10 microseconds. One set of timing pulses, as represented by curve A of Fig. 2, is supplied to a conductor 11 while the other set of timing pulses, as represented by curve B of Fig. 2, is supplied to another conductor 12. The two sets of pulses are offset in time so that the pulses of one set occur halfway between the pulses of the other set. The set of timing pulses supplied to the conductor 11 is, in turn, supplied through a repetition-period limiter circuit 13, which will be mentioned in more detail hereinafter, to a gating-signal generator 14 which, in turn, is coupled to a reference-pulse selector 15. The gating-signal generator 14 may be, for example, a conventional generator of the blocking oscillator type while the reference-pulse selector 15 may be a conventional coincidence circuit.

The set of timing pulses supplied to conductor 12 is, in turn, supplied thereby to the reference-pulse selector 15. Meanwhile, the gating-signal generator 14 is periodically triggered by certain of the timing pulses on conductor 11 and as a result thereof produces gating signals as represented by curve C of Fig. 2. These gating signals are, in turn, supplied to the reference-pulse selector 15 and serve to condition the selector 15 so that any timing pulse appearing on the conductor 12 during the occurrence of one of these gating signals is translated by the selector 15 to the output terminals 16, 16. In this manner, periodic reference pulses, as represented by curve D of Fig. 2, are supplied to the output terminals 16, 16.

The reference pulses translated by the reference-pulse selector 15 are additionally supplied to a timing circuit comprising a long duration gating-signal generator 17 coupled in cascade with a sweep-signal generator 18 and a pick-off diode circuit 19. The long duration gating-signal generator 17 may be, for example, a conventional bistable relaxation oscillator circuit of the so-called "flip-top" type. In a similar vein, the sweep-signal generator 18 and pick-off diode circuit 19 are also of conventional construction. The gating-signal generator 17 is triggered by each selected reference pulse so as to produce periodic gating signals of relatively long duration, as represented by curve E of Fig. 2, which, in turn, are supplied to the sweep-signal generator 18. It should be noted that the long duration gating signals, as represented by curve E of Fig. 2, may appear to be somewhat distorted. This is because of the breaks in the time scale of Fig. 2 which were necessitated by reason of practical convenience.

The sweep-signal generator 18 is enabled during the occurrence of each long duration gating signal to generate a sweep signal of so-called "saw-tooth" wave form which, in turn, is supplied to the pick-off diode circuit 19. Also supplied to the pick-off diode circuit 19 are the timing pulses appearing on conductor 11. The pick-off diode circuit 19 is effective to superimpose these timing pulses on top of the saw-tooth sweep wave form so that whenever the combined magnitude of saw-tooth plus timing pulses exceeds a reference level determined by an adjustable resistor 24 the pulse so exceeding the reference level is supplied to the output terminals of the pick-off diode circuit 19. My means of this picked off timing pulse, the termination of each sweep signal and, hence, of each timing cycle is determined by one of the timing pulses on the conductor 11.

The pick-off diode circuit 19 is, in turn, coupled to a gating-signal generator 20 which, in turn, is coupled to a delayed-pulse selector 21. The gating-signal generator 20 may be of the conventional blocking oscillator type while the delayed-pulse selector 21 may be a conventional coincidence circuit. In response to each pulse that is picked off by the diode circuit 19, the gating-signal generator 20 develops a relatively short duration gating signal, as represented by curve F of Fig. 2. This gating signal is, in turn, supplied to the delayed-pulse selector 21 and enables that selector to translate any timing pulse appearing on conductor 12 during the duration of the gating signal. In this manner, periodic delays pulses, as represented by curve G of Fig. 2, are supplied to the output terminals 22, 22. Each gating signal from the generator 20 is also supplied back to the long duration gating-signal generator 17 and the leading edge thereof is effective to terminate the long duration gating signal and, hence, the timing cycle of the sweep-signal generator 18.

To summarize briefly, one of the timing pulses on conductor 11 triggers generator 14 which, in turn, enables the reference-pulse selector 15 to select a timing pulse appearing on the conductor 12. This selected timing pulse serves as a reference pulse and, additionally, serves to initiate a timing cycle which results in the gating-signal generator 20 enabling the delayed-pulse selector 21 to select a later timing pulse appearing on the conductor 12 which is supplied to the terminals 22, 22 and serves as a delayed pulse. This whole process is repetitive in nature so that periodic reference-pulse-delayed-pulse pairs are produced, the reference pulses being supplied to terminals 16, 16 and the delayed pulses being supplied to terminals 22, 22. A variable parameter 23 of the gating-signal generator 14 permits adjustment of the repetition period of the pulse pairs while the variable resistor 24 associated with the pick-off diode circuit 19 permits adjustment of the delay interval between each reference pulse and the corresponding delayed pulse.

A system of this type is particularly useful in testing radar equipment wherein the equipment under test is periodically triggered by the reference pulses from the terminals 16, 16 and the reaction of the radar equipment thereto is displayed on a cathode-ray oscilloscope which is triggered just prior to the occurrence of the reaction by delayed pulses from the terminals 22, 22 of the system. The delay interval between each reference pulse and the corresponding delayed pulse may be accurately determined by utilizing suitable pulse-counting circuits to count the number of timing pulses occurring between each reference and delayed pulse as mentioned more fully in the copending application Serial No. 387,853.

*Description of Fig. 1 repetition-period limiter*

Considering now the details of the repetition-period limiter of Fig. 1, the repetition-period limiter is intended for use in a system including circuit means for periodically developing a reference pulse and initiating a timing cycle which results in subsequent development of a delayed pulse, where the repetition period and the delay interval between reference pulse and delayed pulse are independently variable, such as, for example, the delayed-pulse generating system of Fig. 1. The repetition-period limiter comprises circuit means for supplying a gating signal of duration representative of the duration of the delay interval. This circuit means may include, for example, the long duration gating-signal generator 17 of the delayed-pulse generating system of Fig. 1.

The repetition-period limiter also includes circuit means responsive to the gating signal for preventing further operation of the circuit means, for example, the generator 14 and selector 15, for periodically developing a reference pulse until a sufficient time after the delay interval to allow satisfactory recovery of other system components, for example, the sweep-signal generator 18. This circuit means comprises the repetition-period limiter circuit 13 which includes a normally nonconductive electron-discharge device such as the tube 30 having a cathode 31, a control electrode 32, and an anode 33. The limiter circuit 13 also includes a first time-constant network for gradually supplying to, for example, the control electrode 32 of the electron-discharge device 30 a portion of the gating signal to render the device 30 conductive and to increase the current flow therethrough as the duration of the delay interval increases. This time-constant network may comprise, for example, a resistor 34 and a condenser 35 suitably connected to the long duration gating-signal generator 17 and to the control electrode 32. The input circuit of tube 30 also includes a suitable grid-leak resistor 36 coupled in parallel with the condenser 35.

The limiter circuit 13 further includes circuit means including a second time-constant network responsive to conduction in the electron-discharge device 30 for preventing further operation of the circuit means represented by units 14 and 15 for periodically developing a reference pulse. The second time-constant network may include, for example, a resistor 37 and a condenser 38 coupled to the cathode 31 of the tube 30 and responsive to conduction in the tube 30 for developing a control signal of magnitude and duration dependent on the duration of the delay interval and for regulating the decay of the control signal subsequent to the delay interval. An electron-discharge device or tube 40 and a coupling condenser 41 and grid-leak resistor 42 coupled to the control electrode thereof constitute circuit means responsive to the control signal including the decay portion thereof for preventing further operation of the circuit means represented by units 14 and 15 for periodically developing a reference pulse. The anode of tube 40 may be coupled, for example, to the anode circuit of the blocking oscillator of generator 14 for enabling triggering of the generator 14 and for supplying a suitable anode potential to the tube 40. One end of the resistor 37 is coupled to a source of potential +C for supplying a suitable bias potential to the cathode of tube 30, the source of bias potential +C being by-passed by a suitable by-pass condenser 43. Note that the bias potential +C has no appreciable biasing effect on tube 40 because it is supplied to both the cathode and control electrode thereof.

*Operation of Fig. 1 repetition-period limiter*

Considering now the operation of the repetition-period limiter just described, it will initially be assumed that the tube 40 is conductive while the tube 30 is in a nonconductive state. The tube 40 is in a conductive condition because the bias potential +C, which is effective to maintain the tube 30 nonconductive, is supplied to both the control electrode and cathode of tube 40.

Now let a timing pulse from the generator 10 be supplied by way of coupling condenser 41 to the control electrode of the tube 40. Such a timing pulse is amplified and supplied by the tube 40 to the gating-signal generator 14 wherein it serves to trigger the generator 14 into producing a gating pulse which, in turn, enables the selector 15 to select one of the timing pulses supplied to the conductor 12 to serve as a reference pulse. This reference pulse may be represented, for example, by the first pulse of curve D of Fig. 2 occurring at what will be designated for convenience as 0 time. As mentioned, this reference pulse serves to trigger the long duration gating-signal generator 17 which, in response thereto, develops, for example, the first long duration gating signal of curve E of Fig. 2 which is indicated as occurring in the time interval from 0 to 495 microseconds.

The long duration gating signal from the generator 17 is supplied to the first time-constant network 34, 35 and, hence, to the control electrode 32 of the tube 30. The voltage level at the control electrode 32, however, cannot change instantaneously because of the relatively large capacitance of the condenser 35. As a result, the voltage at the control electrode 32, in response to the long duration gating signal, increases in a gradual manner thereby gradually increasing current flow through the tube 30.

The second time-constant network 37, 38 is responsive to the current flow through the tube 30 to develop a control signal as represented by curve H of Fig. 2. It should be noted that this curve has a substantial portion of the mid-part thereof removed as indicated by the break in the time axis of Fig. 2. This is done in order better to show what occurs at the end of the timing cycle. Thus, as indicated by curve H, the second time-constant network 37, 38 develops a control signal which gradually builds up in an exponential manner as the current flow through the tube 30 increases. This build up of the control signal continues until the long duration gating signal terminates, for example, as shown at the point of time corresponding to 495 microseconds. As mentioned, the termination of the long duration gating signal is controlled by the leading edge of the gating signal represented by curve F which also serves to select the delayed pulse occurring at the 500-microsecond interval as indicated by curve G.

During the time interval over which the control signal, represented by curve H, exceeds a potential level, represented by curve I of Fig. 2, the tube 40 is rendered nonconductive because the control signal is effective to bias the cathode of tube 40 sufficiently positive with respect to the control electrode thereof. As a result, timing pulses supplied to the control electrode of tube 40 are not translated thereby during this time interval and, hence, cannot trigger the generator 14. In this manner, the limiting circuit 13 limits the repetition period and prevents it from becoming less than the delay interval. The impedance of by-pass condenser 43 is so small, due to the large value of capacitance thereof, that condenser 43 plays no effective role in the present discussion.

Upon termination of the long duration gating signal, the condenser 35 begins discharging through the resistor 36 thus causing current flow through tube 30 to decrease. As current flow through the tube 30 ceases, condenser 38 begins to discharge through resistor 37 and, hence, the voltage across condenser 38 begins to decay as indicated by the downward sloping portion of curve H occurring over the 495–530 microsecond time interval. As the magnitude of the control signal thus decays, the level represented by curve I of Fig. 2 is reached, below which the voltage across condenser 38 becomes sufficiently low so that the tube 40 again becomes conductive.

Now that tube 40 is again conductive the next timing pulse supplied to the control electrode thereof is then effective to trigger the gating-signal generator 14 for a second time and, hence, start a second timing cycle. It will be noted that the limiting action of circuit 13 is extended beyond the delay interval by an amount corresponding to the decay portion of curve H.

In order to illustrate how this recovery interval, that is, the extended limiting interval of circuit 13 occurring after the termination of the long duration gating signal of curve E, automatically varies in accordance with the duration of the delay interval, it will be assumed that the adjustable resistor 24 of the pick-off diode circuit 19 is adjusted so that the gating signal of curve F now occurs, as represented by the dash line curve F′, at a time such that a delayed pulse, represented by curve G′, is selected 800 microseconds after selection of the reference pulse. Because the delay interval has thus been extended, the application of the long duration gating signal to the time-constant network 34, 35 is maintained over a longer time interval so that the voltage at the control electrode 32 of tube 30 builds up to a greater value. In a corresponding manner the magnitude of the control signal across the condenser 38, as indicated by curve H′ of Fig. 2, reaches a greater value before the long duration gating signal is terminated. As a result, the decay portion of the control signal H′ extends over a longer time interval, as represented by the interval between 795 and 850 microseconds. In this manner, the length of the recovery interval is automatically extended as the duration of the delay interval between reference pulse and delayed pulse is increased. As a result, sufficient time is allowed for the other units of the delayed-pulse generating system, particularly the sweep-signal generator 18, to recover from the previous timing cycle before the next timing cycle is initiated.

While the limiting circuit 13 shows the application of the control signal developed across the second time-constant network 37, 38 to the tube 40 to cut that tube off to prevent translation of trigger pulses to the generator 14 and, hence, prevent triggering of generator 14, the control signal need not necessarily be utilized in this manner to prevent triggering of the generator 14. For example, the tube 40 may be dispensed with and the control signal may be applied directly, through a suitable coupling network, to the control electrode of a generator tube within the generator 14 itself.

While applicant does not intend to limit the invention to any particular design constants, the following values have been found suitable for the present invention:

| | | |
|---|---|---|
| Condenser 35 | micromicrofarads | 2500 |
| Condenser 38 | do | 2200 |
| Condenser 41 | do | 150 |
| Condenser 43 | do | 8 |
| Resistor 34 | megohms | 1.8 |
| Resistor 36 | do | 3.9 |
| Resistor 37 | ohms | 47,000 |
| Resistor 42 | do | 33,000 |
| Tube 30 | | ½ 12AU7 |
| Tube 40 | | ½ 12AU7 |
| +B | volts | +300 |
| +C | do | +150 |

From the foregoing description of the invention it will be apparent that a repetition-period limiter constructed in accordance with the present invention represents a new and novel repetition-period limiter for a delayed-pulse generating system where the repetition period and delay interval thereof are independently variable. In addition to eliminating ambiguity by preventing the repetition period from becoming less than the delay interval, a repetition-period limiter constructed in accordance with the present invention also automatically extends the limiting action thereof beyond the delay interval by an amount proportional to the duration of the delay interval in order to allow sufficient time for the recovery of other units of the system, particularly the timing circuits thereof, the required recovery time of which increases as the delay interval increases.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus comprising: first circuit means for periodically developing a reference pulse; timing circuit means responsive to the generation of a reference pulse for initiating a timing cycle which results in subsequent development of a delayed pulse, where the repetition period and the delay interval between reference pulse and delayed pulse are independently variable; and a repetition-period limiter comprising circuit means responsive to the timing cycle of the timing circuit means for supplying a gating signal of duration representative of the duration of the delay interval and circuit means responsive to the gating signal for preventing further operation of the first circuit means until a sufficient time after the delay interval to allow satisfactory recovery of other system components.

2. Apparatus comprising: first circuit means for periodically developing a reference pulse; timing circuit means responsive to the generation of a reference pulse for initiating a timing cycle which results in subsequent development of a delayed pulse, where the repetition period and the delay interval between reference pulse and delayed pulse are independently variable; and a repetition-period limiter comprising a normally nonconductive electron-discharge device, circuit means responsive to the timing cycle of the timing circuit means for supplying a gating signal of duration representative of the duration of the delay interval, a first time-constant network for gradually supplying to the electron-discharge device a portion of the gating signal to render to device conductive and to increase the current flow therethrough as the duration of the delay interval increases, and circuit means including a second time-constant network responsive to conduction in the electron-discharge device for preventing further operation of the first circuit means until a sufficient time after the delay interval to allow satisfactory recovery of other system components.

3. Apparatus comprising: first circuit means for periodically developing a reference pulse; timing circuit means responsive to the generation of a reference pulse for initiating a timing cycle which results in subsequent development of a delayed pulse, where the repetition period and the delay interval between reference pulse and delayed pulse are independently variable; and a repetition-period limiter comprising a normally nonconductive electron-discharge device having a cathode, a control electrode, and an anode, circuit means responsive to the timing cycle of the timing circuit means for supplying a gating signal of duration representative of the duration of the delay interval, a first time-constant network for gradually supplying to the control electrode of the electron-discharge device a portion of the gating signal to render the device conductive and to increase the current flow therethrough as the duration of the delay interval increases, and circuit means including a second time-constant network coupled to the cathode of the electron-discharge device and responsive to conduction in the electron-discharge device for preventing further operation of the first circuit means until a sufficient time after the delay interval to allow satisfactory recovery of other system components.

4. Apparatus comprising: first circuit means for periodically developing a reference pulse; timing circuit means responsive to the generation of a reference pulse for initiating a timing cycle which results in subsequent development of a delayed pulse, where the repetition period and the delay interval between reference pulse and delayed pulse are independently variable; and a repetition-period limiter comprising a normally nonconductive electron-discharge device, circuit means responsive to the timing cycle of the timing circuit means for supplying a gating signal of duration representative of the duration of the delay interval, a first resistor-condenser time-constant network for gradually supplying to the electron-discharge device a portion of the gating signal to render the device conductive and to increase the current flow therethrough as the duration of the delay interval increases, and circuit means including a second resistor-condenser time-constant network responsive to conduction in the electron-discharge device for preventing further operation of the first circuit means until a sufficient time after the delay interval to allow satisfactory recovery of other system components.

5. Apparatus comprising: first circuit means for periodically developing a reference pulse; timing circuit means responsive to the generation of a reference pulse for inititing a timing cycle which results in subsequent development of a delayed pulse, where the repetition period and the delay interval between reference pulse and delayed pulse are independently variable; and a repetition-period limiter comprising a normally nonconductive electron discharge-device, circuit means responsive to the timing cycle of the timing circuit means for supplying a gating signal of duration representative of the duration of the delay interval, a first time-constant network for gradually supplying to the electron-discharge device a portion of the gating signal to render the device conductive and to increase the current flow therethrough as the duration of the delay interval increases, a second time-constant network responsive to conduction in the electron-discharge device for developing a control signal of magnitude and duration dependent on the duration of the delay interval and for regulating the decay of the control signal subsequent to the delay interval, and circuit means responsive to the control signal including the decay portion thereof for preventing further operation of the first circuit means until a sufficient time after the delay interval to allow satisfactory recovery of other system components.

References Cited in the file of this patent

UNITED STATES PATENTS

| | | |
|---|---|---|
| 2,534,535 | Smith et al. | Dec. 19, 1950 |
| 2,567,203 | Golay | Sept. 11, 1951 |
| 2,638,572 | Goubau | May 12, 1953 |
| 2,676,301 | Hansell | Apr. 20, 1954 |